Patented Oct. 17, 1939

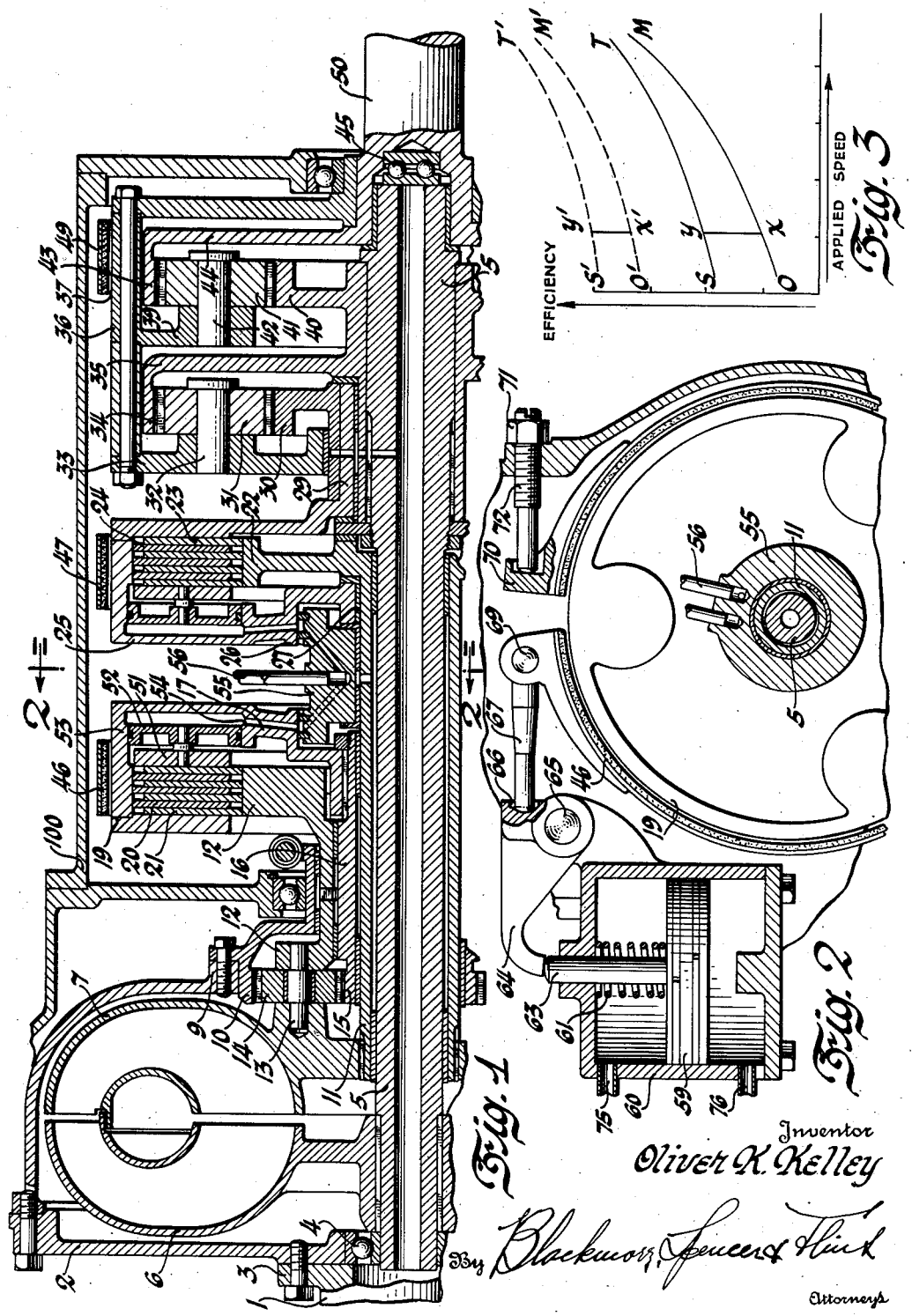

2,176,138

UNITED STATES PATENT OFFICE 2,176,138

COMBINATION FLUID TURBO CLUTCH AND VARIABLE SPEED GEARING

Oliver K. Kelley, Birmingham, Mich., assignor to General Motors Corporation, Detroit, Mich., a corporation of Delaware Application February 5, 1937, Serial No. 124,283

20 Claims. (Cl. 74—189.5)

My invention herewith described relates to variable speed transmission gearing, particularly for use in motor vehicles, of a form in which planetary gearing affords combinations of multiple torque paths between a prime mover and a loadshaft, various of said paths embodying fluid turbo elements of the type known as "fluid flywheel" elements.

The particular features of my disclosure include a novel arrangement of such combinations in which the predetermined efficiencies of the fluid turbo device bear a scalar relationship to the range of transmission speed ratios afforded by the combined selective speed gearing.

A further advantage in my arrangement is the low drag torque inherent in the fluid combination at idling engine speeds with the transmission setting at low ratio. This makes it possible for a car driver, for example, to have the ratio control preset in low gear with the vehicle standing still, and there is no creeping of the vehicle forward until the engine is accelerated to a speed at which the fluid coupling begins to deliver net torque to output.

My arrangement possesses the further advantage that it yields a controlled efficiency of the fluid coupling which not only gives a gentle start when the vehicle is put into motion in the low ratios, but also provides a selective set of higher efficiencies when the drive is established for running in the higher ratios, wherein the customary use occurs in most vehicle operation.

The fluid coupling may have radial vanes or contoured pockets, similar to such couplings of the Föttinger or the Radcliffe types, the only essential requirement being that means are provided to maintain a predetermined quantity of liquid in the portion of the casing wherein the fluid elements rotate. The regular transmission oil may be used; the engine crankcase oil, or separate liquid, independently supplied, and not associated with either such source. Such liquid may be fed into the coupling compartment under pressure, metered by valving of automatic or manual control form.

Separate housings may be used for my fluid turbo clutch and transmission assembly, but in the present disclosure I find it convenient to assemble both in one casing.

Attention is called to the fact that no main engine clutch is shown in my construction, the ordinary requirement for a definite no-drive or neutral condition being provided by a full release of all transmission reaction members in addition to the above mentioned slip factor condition at idling, of the fluid coupling.

A highly useful advantage of my arrangement is the structural combination wherewith I dispense with the need for separate reverse driving transmission means, and obtain reverse drive by controlling one member of a torque recombining gearing, which normally functions as such in forward driving.

Other advantages are described in detail in the specification following. In the accompanying drawing:

Figure 1 is an elevation section of a transmission assembly embodying my invention, the power plant drive being at the left, and the load shaft connecting to vehicle wheels or equivalent drive.

Figure 2 is a section of the structure of Figure 1 taken at 2—2 of that figure, showing the actuation means for the brake device, equivalent to similar devices utilized to actuate the other brakes shown in Figure 1.

Figure 3 is a chart describing the range of efficiencies of the fluid turbo clutch 6—7 of Figure 1, for various conditions of drive as described in the text following.

My disclosure is broadly a combination of controlled selective gearing with the elements of a fluid torbo clutch of the type known as a fluid flywheel, for example, as described in U. S. Patent 1,914,289 to L. H. Pomeroy, but arranged in such a way that for selected changes in speed ratio of the gearing, the efficiency of the fluid turbo clutch increases proportionally; or conversely, the slip factor of said clutch progressively diminishes.

The following specification describes in detail the arrangement wherein such characteristics are provided.

In Figure 1, shaft 1 is the engine or prime mover shaft joined to rotatable casing 2 at 3 by appropriate flange bolts or similar means, the pilot bearing 4 supporting shaft 5 to which is fixed turbo vane wheel 6, mating with complementary turbo vane wheel 7 relatively rotatable to wheel 6.

Casing 2 surrounds and encloses the vane wheels 6 and 7, terminating in flange 9 to which is fixed annulus gear 10.

Hollow shaft 11 surrounds solid shaft 5 for a portion of its length and is attached to planet carrier 12 and vane wheel 7, as a composite structure. Spindles 13 fixed in carrier 12 act as shafts for planet gears 14, meshing with annulus 10, and with sun gear 15 affixed to hollow shaft 16 surrounding shaft 11. The shafting is supported in bearing in casing 100.

Radial drum member 17 attached to shaft 16 is shaped to form a brake surface 19, and also carries a group of clutch elements 20 mating with clutch elements 21 arranged to rotate with carrier 12.

Clutch hub 22 fixed to a rearward extension of shaft 11 serves as a mounting for a group of clutch elements 23 which mate with a group of clutch elements 24 carried by drum 25 integral with web 26, the outer portion of drum 25 being formed into a braking surface. Web 26 is supported on shaft 11 by bearing 27.

Drum 25 is integral with or attached to hollow shaft 29 arranged to rotate with sun gear 30. Planets 31 meshing with gear 30 rotate on spindles 32 mounted in carrier 33, and also mesh with annulus gear 34 integral with drum 35 affixed to shaft 5.

Carrier 33 is attached to drum 36 which has external brake surface 37, and web 39 of drum 36 is the carrier for the third group of gears which form the reversing gear means.

Sun gear 40 affixed to shaft 5 meshes with planet gears 41 mounted on spindles 42 rotating with and attached to web 39. Annulus gear 43 integral with drum 44 rotates with the output or load shaft 50, the pilot bearing 45 supporting the end of shaft 5 in shaft 50.

Brake member 46 is effective to lock drum 17 against rotation; brake member 47 may lock drum 25; and brake 49 may likewise prevent rotation of drum 36.

The precedingly described structure, for convenience, will be designated by groups. Unit 1 consisting of sun gear 15, annulus 10 and planets 14, and associated elements including brake 46 and clutch 20—21, operates such that when brake 46 is applied to drum 17, sun gear 15 serves as the reaction element, whereby rotation of annulus 10 compels rotation of vane wheel 7 at some reduced fractional speed of engine shaft 1. When clutch 20—21 is engaged and brake 46 released, a couple established between carrier 12 and sun gear 15 compels vane wheel 7 to rotate at engine speed. Alternate operation of brake 46 and clutch 20—21 then varies the speed at which vane wheel 7 rotates with respect to engine speed. With neither of brake 46 and clutch 20—21 actuated, there can be no drive transmitted through vane wheels 6—7 and to the remainder of the gearing.

Unit 2, consisting of annulus 34, sun gear 30, planets 31 and carrier 33, and associated elements, including brake 47 and clutch 23—24 is the means for obtaining variations in drive between unit 1 and elements transmitting drive to the load shaft 50. Alternate operation of brake 47 and clutch 23—24 compels speed changes between shaft 5 and shaft 50 as modified by speed changes applied to sun gear 30.

Unit 3, consisting of sun gear 40, planets 41, annulus gear 43, and associated elements, including brake 49, serves two purposes; as a reversing gear when brake 49 prevents rotation of drum 36, and as a variable coupling arrangement when brake 49 is released, and torque may flow from the engine connected elements to sun gear 40 and simultaneously to carrier 39, when annulus gear resolves the delivered torque forces. It should be clear that the manipulation of brake 47 and clutch 23—24 affects the operating conditions of both of units 2 and 3, whereas brake 49 in my example, is only used to establish reverse gear drive.

Means are shown to engage and release the various clutches and brakes of my disclosure.

Clutch 20—21 is engaged by presser plate 51 moved by pistons 52 in cylinders 53 integral with drum 17, fed by pressure in passage 54 from gland 55 mounted above shaft 11, receiving fluid pressure through pipe 56, in this example from a controlled external means, also coordinately controlling the operation of brake applying means such as described in Figure 2.

The assembly of parts in Figure 2 is descriptive of the brake applying means required for any of brakes 46, 47 and 49, as an operative example. In the controls for units 1 and 2, brake 46 and clutch 20—21 may be coordinately operated; and brake 47 with clutch 23—24 in the same manner, whereas for unit 3, only brake 49 by itself need be effective provided drive is operatively established through unit 1. The control means for the entire clutch and gearing disclosure in my present application may be arranged to select actuation or operation for any brake or clutch individually, or in combinations of two brakes, two clutches, a brake and clutch, or any desired pattern of action or release as required to establish controlled variable speed combinations.

Figure 2 shows cylinder 60 in which piston 59 slides, arranged to oppose springs 61 and transfer force to piston rod 63. Springs 61 normally load piston 59 so as to move rocker 64 about pivot 65, and through notch 66 relieve thrust on rod 67 pivoted to the eye 69 of brake band 46, shown as an illustrative example for any of brakes 47 or 49. The anchor end 70 of band 46 may be adjusted by nut 71 on the threaded length of slotted bolt 72.

From an external servo source, through appropriate control means is supplied fluid pressure through port 75, working on the opposite face of piston 59. Fluid pressure in cylinder 60, acting against the other face of piston 59 is likewise supplied through port 76, from the above noted source.

According to the control characteristics desired by the designer, port 76 may be joined externally to pipe 56 so that brake 46 and clutch 20—21 are coordinately operated; that is, when fluid pressure is admitted to both 75 and 56, the brake 46 may be released while fluid pressure is applied to cylinders 53, increasing loading on clutch 20—21 through pistons 52 and pressure plate 51, until brake 46 is released and clutch 20—21 fully engaged. During this change interval fluid pressure may be admitted from the above mentioned source to port 76 of cylinder 60, whereby the torque release interval of brake 46 and the torque capacity of clutch 20—21 may be modified or varied.

When the structure of Figure 2 is applied to the operation of brake 47 and clutch 23—24 of unit 2, the external porting 75—76 of cylinder 60 and pipe 56 may be so arranged in sequence of operation with the fluid pressure source that instead of brake release occurring while the clutching action is being established, a neutral dwell in the shift interval may be arranged wherein there is no drive or couple resulting from either brake and clutch action. The same regime may also be followed in the control of brake 46 and clutch 20—21.

In this disclosure, the manner of arrangement of external controls is not germane to the invention herein described, except as is needed to describe an operative structure, the specific disclosure of such controls being separately detailed in an additional patent specification.

In understanding the advantages of the construction and the operation of my invention it is necessary to examine carefully the showing of Figure 1. With the engine connected to shaft 1 assumed to be idling at low speed, and the load of the vehicle applied to shaft 50, while none of the described brakes and clutches are engaged or applied, it will be apparent that there can be no drive since there is no established fulcrum or reaction between annulus 10 rotating at engine speed and annulus 43 connected to output shaft 50.

Now if engine speed be increased from idling, spinning planets 14 and sun gear 15 by friction drag, the moment a slipping couple is established between vane wheels 6—7 by circulation of oil through the vane passages, shaft 5 will transmit energy to gear 40, and since annulus 43 is stopped, planets 41 will planetate, causing drum 36 to rotate.

If at this point, brake 49 be applied, vane wheel 6 would be subject to an incremental proportion of load torque. Assuming a large value for load torque on shaft 50, and sufficient fluid rotation in the fluid flywheel elements 6—7, vane wheel 7 will tend to stop or decelerate, whereupon annulus 10 fulcruming on the retarded planets 14, would cause sun gear 15 and connected parts to spin backward at some speed above engine speed. It is apparent that such residual torque forces are not capable of transmitting drive to shaft 50, and the arrangement thus far described provides no drive or neutral.

Let it now be assumed that brake 46 only be applied, stopping sun gear 15. Engine speed applied to annulus 10 will force vane wheel 7 to rotate ahead at some speed slower than engine speed because of the gear diameter of elements 15, 14 and 10. There can still be no drive to shaft 50, since coupling force delivered from wheel 7 to wheel 6 can only spin carrier 39 and drum 36 which latter have no couple nor reaction by either brake 47 or clutch 23—24.

It will be seen that for torque to flow between the engine and load shaft 50, some couple or reaction is needed in units 2 and 3.

If brake 47 also be applied, sun gear 30 of unit 2 becomes a fulcrum or reaction point. When this be concurrent with the application of brake 46 in unit 1, vane wheel 7 must rotate, applying a fluid couple to shaft 5 through wheel 6. Now with annulus 34 and sun gear 40 both furnishing a torque component; carrier 32, because of sun gear 30 acting as a reactor, and carrier 42 rotating with 32 but receiving a torque component because of the resistance of annulus 43, the resultant rotation of annulus 43 and output shaft 50 is a compound motion wherein torque divided from shaft 5 through gears 34 and 40 is recombined at gear 43 with a mechanical advantage proportional to the incremental ratio factors of the gears of units 2 and 3.

All torque applied to shaft 50 passes through vane wheels 6 and 7, the relative slower speed of wheel 7 to engine shaft 1 providing a slip factor between 6 and 7 at a point on the typical curve of Figure 3 for fluid flywheel devices, where the efficiency is low, as at point X on line OM of that figure.

For a given rotation range of shaft 1 there is an infinite series of X and Y points possible on the above curves. When carrier 12 and sun-gear 15 are rigidly coupled, causing vane wheel 7 to move at engine speed, the torque transferred through vane wheels 6—7 is represented by some point Y on curve S—T.

It can be assumed for a low ratio setting of unit 2, as with the brake 47 set, there will be two drive conditions between shafts 1 and 50, depending on whether in unit 1, brake 46 or clutch 20—21 are actuated. These two conditions provide two net speed ratios, unique in that there is a degree of flexibility in the drive, having one slip value, as at X, and another, as at Y. This function is of course provided by the variable coupling effect produced between vane wheels 6 and 7, when wheel 7 rotates at engine speed, or at some reduced speed function thereof.

The driving conditions when clutch 23—24 is coupled and brake 46 released, are now considered. The couple thus set up between carrier 12 of unit 1 and sungear 30 of unit 2 transfers the rotation of vane wheel 7 to sungear 30 direct; whether wheel 7 is compelled to run at engine speed, or at some reduction gear speed established by locking of brake 46.

The resistance of shaft 50 at annulus 43 sets up these conditions; a torque component derived by vane wheel 6 from rotation of wheel 7 is delivered to sungear 40 of unit 3 and annulus 34 of unit 2; a second torque component through shaft 11, hub 22, clutch 23—24, and sungear 30 is combined with a torque value derived from rotation of annulus 34, resulting in rotation of carrier 32 and drum 33—36, applied to carrier 42. Here the first component delivered at sungear 40 combines with the value at carrier 42 received from the motion of 32 obtained from rotation of annulus 34 and sungear 30 of unit 2.

A second group of curves O'—M' and S'—T' represents the two ranges of efficiencies of the fluid coupling means when clutch 23—24 is engaged.

When clutch 20—21 of unit 1 is coupled under these conditions, the net effect obtained at annulus 43 and at load shaft 50 is direct drive, since the unitary rotation of the rotating parts of unit 1, provides a drive in which the relative slip between wheels 6 and 7 is de-multiplied by the series-parallel system comprising the gearing of units 2 and 3.

Because of the known increase in efficiency with applied speed of fluid couplings such as vane wheels 6 and 7, the losses in torque in the present disclosure, because of the unique gearing combination, are reduced materially over structures in which the fluid coupling is placed directly between a power shaft and a load shaft.

Furthermore, the novel feature of the combination gearing arrangement of unit 1 wherein selective control over the relative speed of the driver vane wheel 7 with respect to the engine shaft speed, adds the unusual flexibility to the system which yields the resultants of curves OM and ST of Figure 3, and is a complement to the further ratio range afforded by the controls of unit 2 wherein resultants of motion at annulus 43 partake of four net forward speed characteristics or ratio ranges, rather than four definite, fixed speed ratios.

In so describing my invention, it appears necessary to stress the fact that the so-called speed ratios made available for drive are not positive, fixed ratios, but in each case are predetermined ratio ranges, within which there are allowances of relative speed in which variation according to engine speed, and driving conditions occur.

To take full advantage of the peculiar characteristics of the so-called fluid fly-wheel, wherein the efficiences vary so widely over a prime mover speed range, I have so related the fluid elements to selective fixed ratio torque paths that in the low ratio settings the fluid coupling is normally operating on the less efficient portions of its efficiency curve, and in high ratio settings is not only operating on the more efficient portions of its cycle, but also the over-all slip between input and output is de-multiplied because of the novel nature of the split-torque recombining means associated with the coupling at the higher ratio settings.

The controls for the brake and clutch combinations may be manual, speed or torque responsive, or speed and torque responsive as desired, and may be manipulated through relay or similar means according to the user's requirements. No claims for invention in such control combinations are herewith made, the preceding statement simply referring to control methods in which some forms of automatic device may be utilized.

The following table of speed ratios provided by actuation of the designated clutch and brake members herein described represents an operative sequence illustrative of the foregoing description. The capital X in each case indicates which of the members is actuated for a given speed ratio range condition.

|         | Brake 46 | Clutch 20—21 | Brake 47 | Clutch 23—24 | Brake 49 |
|---------|----------|--------------|----------|--------------|----------|
| Low     | X        |              | X        |              |          |
| 2nd     |          | X            | X        |              |          |
| 3rd     | X        |              |          | X            |          |
| High    |          | X            |          | X            |          |
| Rev     | X        |              |          |              | X        |
| Neutral |          |              |          |              |          |

Note that for a definite neutral or no-drive condition, none of the brakes or clutches are energised.

It is herewith emphasized that my invention as described yields a separate slip characteristic for each setting of transmission ratio controls, and as described, the slip is high for low ratio settings, and low for high ratio settings. In my present example, there are two intermediate forward speeds between low and high, in which as progression upward in ratio occurs, the efficiency of the fluid coupling, by my arrangement likewise increases.

One very important advantage accruing from my arrangement is the softness of the drive in the low speed ratios as compared with ordinary fluid and gear combinations, and the further resultant of progressive efficiency increase as speed ratio changes from the low to the high settings.

Another important feature is the extremely low drag torque at normal engine idling speeds with the transmission units set for low gear. This does away with the phenomenon known as "creep", experienced ordinarily with fluid couplings of this general type. It is a known fact that in a so-called fluid flywheel, when one member is stopped, the drag is proportional to a factor greater than the square law value. In my arrangement, which inherently reduces the speed of the primary rotor of the fluid coupling when set for low gear, the drag torque is thereby reduced by that factor superimposed on the ratio of demultiplication.

Furthermore, whatever drag there may be, is not increased by the entire low gear ratio as in commonly known arrangements, but is subject only to multiplication of one portion of the total low gear train. It is therefore evident that the final drag torque delivered to the final drive at engine idling when the transmission is set for low gear is of extremely low value as compared with ordinary series driving arrangements of this character.

Conversely, when the transmission is set for high ratio drive, the fluid coupling is arranged so that the engine torque is delivered through multiple paths, or as is described in this art, is operating through a split-torque arrangement, wherein a part of the input torque flows through the mechanical system, and a part through the fluid coupling. The advantage of this is that the fluid coupling is operating under a relatively light torque, and therefore at higher efficiency.

The fluid efficiency losses, whatever they now may be, therefore only apply to a reduced portion of the supplied engine energy, the remainder of which passes through highly efficient mechanical gearing paths.

In view of the preceding description, the several objects of the invention are achieved, and associated advantageous results accomplished.

In determining the scope of my invention herewith, it is intended that all matter disclosed in the preceding description or in accompanying drawing shall be interpreted as illustrative and in no sense limiting on the principles revealed in this application.

I claim:

1. In compound drives for motor vehicles, in combination, a driving shaft and a load shaft, gearing connected to said driving shaft arranged to transmit selected direct or multiplied torque thru a hydraulic coupling of the fluid turbine type, variable speed gearing receiving torque thru rotation of said coupling including torque dividing and torque resolving means, and control means for said variable speed gearing operative to select at least two ratio ranges within which the selective operation of said first named gearing provides two distinct efficiency ranges of said coupling.

2. In compound drives for motor vehicles, in combination, a selective variable speed changing means connected to a power shaft arranged to drive one element of a fluid turbo coupling at the speed of said shaft or at a reduction ratio speed thereof, a load shaft arranged to receive a torque component from a second turbo element of said coupling, gearing connected between said first named element of said coupling and said load shaft and selecting means for said gearing operative to yield at least two speed ratio ranges between said power shaft and said load shaft for given settings of said speed changing means.

3. In variable speed drives for motor driven mechanisms, in combination, a power shaft and a load shaft, fluid turbo coupling means arranged to transmit torque between said shafts, ratio determining means, control mechanism associated with said coupling means effective to divide the torque transmitted thereby, and variable speed gearing adapted to combine the divided torque from said power shaft and at least one element of said means, and adapted to deliver said combined torque to said load shaft.

4. In power transmission devices, in combination, a power shaft, an annular gear connected thereto meshing with planet gearing, a gear meshing with said planet gearing adapted to remain fixed as a reaction member or to rotate at the same speed as said annular gear, a carrier for said planet gearing connected to one element of a fluid turbo coupling, a load shaft arranged to be rotated by torque received by a second element of said coupling and means operative to vary the speed ratio of drive between said second element of said coupling and said load shaft.

5. In composite drive devices, in combination, a power shaft and a load shaft joined by a variable speed transmission unit including a primary driving member, a reaction member and an intermediate member, a brake arranged to lock said reaction member against rotation, a friction clutch arranged to couple said intermediate member to and compel rotation thereof with said reaction member, and a two-element fluid turbo coupling driven by said intermediate member adapted to transmit divided torque thru gearing from both said elements to said load shaft.

6. In compound drive apparatus, in combination, a composite transmission mechanism comprising a first variable speed gearing unit, a fluid turbo coupling, a second variable speed gearing unit, a third variable speed gearing unit, said three units being serially arranged between the power supplying shaft, the fluid turbo coupling and the load shaft, coordinately controllable brake and clutch devices arranged to vary the drive of said first unit through said coupling, coordinately controllable brake and clutch devices arranged to vary the drive of said second unit, a brake device arranged to change the direction of rotation of drive thru said third unit, and said units and said devices being arranged whereby said fluid turbo coupling is operative to transmit divided torque between said power and load shafts simultaneously with the operation of said three units.

7. In variable speed gearing, in combination, a power shaft, an intermediate shaft, a load shaft, a pilot bearing between said first two named shafts, a second pilot bearing between said two latter named two shafts, a hollow shaft surrounding said intermediate shaft for a portion of its length, a second hollow shaft surrounding said first named hollow shaft, bearings between said intermediate shaft and said first hollow shaft, bearings between said hollow shafts, said bearings permitting relative rotations of all of said shafts, a fluid turbo coupling having one element connected to said intermediate shaft, a second element connected to said first named hollow shaft, and variable speed gearing arranged between said power shaft and said hollow shafts adapted to be selectively controlled whereby said first named hollow shaft may be rotated at the same speed as said power shaft or at a speed ratio thereto according to the selective operation of gearing.

8. In combination drives for motor vehicles, in combination, a fluid turbo coupling arranged to transmit drive between driving and driven members, variable speed gearing arranged to transmit simultaneously a portion of the torque between said members, actuating means for said gearing comprising clutch and brake devices for establishing different driving speed ratios therein, and control means for said actuating means operative to compel said actuating means to establish a higher efficiency drive thru said coupling commensurate with changes in ratio established by said actuating means.

9. A combination drive for motor vehicles, comprising driving and driven shafts, selective variable speed gearing arranged to transmit torque therebetween, clutch and brake devices adapted to establish different speed ratios of said gearing, a fluid turbo coupling arranged to transmit torque therebetween at relatively high and relatively low efficiencies, and control means operative upon said devices to establish high or low driving ratios in said gearing coincidentally operative to vary the efficiency of said coupling proportionally to the ratios established by said means.

10. In a combination gearing and fluid coupling drive, a variable speed transmission device embodying a fluid flywheel comprising a vane wheel selectively rotatable at the speed of said engine shaft or at a fixed reduction speed ratio thereto, a second vane wheel arranged to coact with said first vane wheel and deliver torque to an output shaft driving member, an output shaft, a hollow shaft member receiving a portion of the torque supplied by said first vane wheel, and gearing adapted to recombine said torque with torque derived from rotation of said second vane wheel whereby to drive said output shaft at varying coupling efficiencies.

11. In composite drive means connecting a prime mover with a load shaft, in combination, a fluid turbo clutch including a continuously rotatable vane wheel, a second vane wheel arranged to receive fluid from said first vane wheel and return it to said vane wheel, selective gearing arranged to compel said first vane wheel to rotate at the speed of said prime mover or at a lower speed, additional selective gearing adapted to transmit torque from both said vane wheels to said load shaft, and control means for said additional selective gearing operative to establish drive for at least two separate speed ratios between said prime mover and load shaft.

12. In composite variable speed drives, in combination, a power shaft, a casing rotated by said shaft, a chamber formed within said casing, a ring gear driven by rotation of said casing, a carrier for planet gears meshing with said ring gear, a sun gear meshing with said planet gears, a fluid turbo clutch having a primary vane wheel and a secondary vane wheel, said primary vane wheel being joined to said carrier, a receiving shaft connected to said secondary vane wheel and rotatable at the same speed therewith, additional clutch means arranged to couple said carrier and receiving shaft for unitary rotation of said power shaft, said casing, said ring gear, said sun gear and said receiving shaft, brake means adapted to prevent rotation of said sun gear whereby the net rotation of said receiving shaft is at a lower speed than the speed of said power shaft, and fluid pressure means selectively operative to actuate either of said additional clutch means or said brake means.

13. In variable speed gearing, in combination, an input shaft and a load shaft, a fluid flywheel having one turbine member arranged to rotate at the speed of said input shaft or at a reduction speed ratio thereof, a second turbine member subject to the torque of said load shaft, gearing arranged to transmit the torque of said second turbine member to said load shaft, and actuation mechanism for said gearing selectively operative to connect said gearing to said first named turbine member whereby divided torque flowing through said gearing and said second turbine member is recombined.

14. In a drive arrangement for motor vehicles, in combination, an engine shaft, a gear driven directly at the speed of said shaft, a fluid turbine clutch, planet gearing meshing with said gear and supported on carrier connected directly to one member of said clutch, a load transmitting shaft directly connected to another member of said turbine clutch, a reaction sustaining gear cooperating with said gearing, and selective means operative upon said gearing for compelling rotation of said first named clutch member with said engine shaft or for compelling rotation of said first named member at a fixed speed ratio to the speed of said engine shaft.

15. In composite drives for controlled variable speed transmissions in combination, a power shaft, a load sustaining shaft, a fluid coupling comprising a driving member having annular spaces, a coacting driven member having mating annular spaces, a planet gearing including input, output and intermediate torque supporting elements, means connecting one of said elements to said power shaft, means connecting another of said elements to said load sustaining shaft through said coupling, and means connecting the third of said elements to a reaction sustaining device, friction coupling means operative to cause said third element to rotate with one of said first two named elements when said reaction sustaining device is inoperative, and control means coordinately effective upon said friction coupling means and said reaction sustaining device whereby said load sustaining shaft may be driven at a higher or lower efficiency ratio of said fluid coupling device.

16. In planetary gearing of the type in which are provided multiple torque paths between a prime mover and a load shaft, in combination, a two-element turbine clutch, variable speed gearing mechanism embodying multiple torque paths establishable through clutches and brakes made operative by fluid pressure servo devices, selective control means for said clutches and brakes effective to establish divided torque between said clutch and said mechanism, said control means being likewise effective through said clutches and brakes to establish divided torque within the gearing of said mechanism.

17. In compound drive transmission structures, in combination, an engine shaft, a two-element fluid turbo clutch, a casing adapted to join said shaft to one element of said turbo clutch through coupling and surrounding both elements thereof, and selective coupling means between said casing and said first named element arranged to engage and disenage drive therebetween.

18. In variable speed transmissions, in combination, a power shaft and a load shaft, a composite transmission interposed between said shafts embodying a fluid turbo coupling and two forward driving variable speed gearing units, a brake for the first of said units arranged to provide one range of speed ratios between said shafts, a coupling clutch for said unit arranged to provide a second range of speed ratios between said shafts, actuating means for said brake and clutch, alternately operable brake and clutch actuation means for the second of said units adapted to provide multiple speed ratios of the aforesaid two speed ratio ranges, and means connecting said actuating means operative to select any one of the four described forward driving conditions.

19. Transmission gearing according to claim 18 where a third brake mechanism is effective upon one of the elements of said second named unit to provide reverse drive between said shafts.

20. In variable speed gearing, in combination, a power shaft, a casing driven thereby, a load shaft, a planetary gear unit including driving, driven and intermediate members, means connecting said casing to one of said members, a rotor element embodying a series of vanes, a second vaned rotor element coacting therewith, means joining said first rotor element with a second of said members, change speed planetary gearing connecting said second rotor element with said load shaft, and control means operative to regulate the rotation of the third of said members whereby to effect the overall speed ratio ranges between said shafts through torque conditions established by ratio changes in said gearing.

OLIVER K. KELLEY.